[54] DEVICE AND A PROCESS FOR ADJUSTING THE DELIVERY QUANTITY OF MULTI-CYLINDER FUEL INJECTION PUMPS

[75] Inventors: Herbert Bechstein, Esslingen; Herbert Biebl, Korb; Wolfgang Eckell, Gebersheim; Anton Franz, Markgroningen; Eberhard Hofmann, Kirchberg, Murr; Hans Stauch, Hemmingen; Heinrich Staudt, Markgroningen-Talhausen; Hellmut Tomasch, Freiberg; Alois Urlberger, Ruit; Theodor Winnewisser, Neuhausen, all of Germany

[73] Assignee: Robert Bosch GmbH, Stuttgart, Germany

[22] Filed: Mar. 27, 1975

[21] Appl. No.: 562,860

[30] Foreign Application Priority Data

Apr. 1, 1974 Germany .......................... 2415718

[52] U.S. Cl. ................................ 73/1 R; 73/119 A

[51] Int. Cl.² ........................................ G01M 19/00

[58] Field of Search ...................... 73/119 A, 3, 1 R

[56] References Cited

UNITED STATES PATENTS

| | | | |
|---|---|---|---|
| 3,246,509 | 4/1966 | Hauck | 73/119 A |
| 3,264,868 | 8/1966 | Hainz | 73/119 A |

*Primary Examiner*—Jerry W. Myracle
*Attorney, Agent, or Firm*—Edwin E. Greigg

[57] ABSTRACT

An apparatus for adjusting the delivery quantity on multi-cylinder fuel injection pumps including a drive unit and a clamping means for the injection pump in the form of an in-line pump. The pump pistons are provided with at least one control edge and are axially arranged and rotatably guided in cylinder barrels. Each piston is held in its fitting position, at least indirectly, by a flange. A mechanically activatable adjusting tool is mounted in the apparatus and operatively arranged to be driven via a control gear. The tool is force lockingly connected to an application point or engagement point on the securing flange of the injection pump or to a transmission element coupled to the securing flange or the cylinder barrel. A servo motor, preferably a stepping motor, is used to drive a control gear which effects movement of the tool.

17 Claims, 5 Drawing Figures

62
64
63
65
40
59
11
12
13
10
29
42
32
31
30
28
58
28a
27
28b
26
46
48
50
16
15
14
49
57
55
56
18
24
20
23
53
17
51
22
52
25
45'
32'
33'
10'
94
93
30
28
17

DEVICE AND A PROCESS FOR ADJUSTING THE DELIVERY QUANTITY OF MULTI-CYLINDER FUEL INJECTION PUMPS

BACKGROUND OF THE INVENTION

This invention relates to a method of and an apparatus for adjusting the delivery quantity of multicylinder fuel injection pumps of the type having a drive unit and a clamping device. The present invention relates, more particularly, to such an apparatus for adjusting the delivery quantity of multi-cylinder fuel injection pumps having pistons, with at least one inclined control edge, which are axially and rotatably guided in cylinder barrels and are each held in their fitting positions at least indirectly by a securing flange clamped against the upper front face of the pump housing by screws. The pistons of the in-line pump are rotatable within a defined angular region to adjust the delivery quantity and are constructed to receive a pressure valve in an extension of the bore guiding the respective pistons. The invention further is concerned with a delivery quantity measuring apparatus for measuring and indicating the quantity of fuel delivered for a given number of piston strokes or unit of time.

Multi-cylinder fuel injection pumps in the form of in-line pumps, more particularly pumps for injecting fuel in diesel engines are mass produced and thus, in addition to reliability of operation, it must be possible for these pumps to be produced, tested and adjusted in an economical manner.

It has been found that the manufacturing of injection pumps can be very highly mechanized, even to the extent of introducing production, transfer and assembly lines. However, using known testing and adjusting methods, the testing and adjusting of the individual elements of the pumps and the functions thereof to effect a uniform delivery quantity have always been very time consuming and require a large staff. Consequently, the conventional testing and adjusting methods are accordingly extremely expensive. In the known testing and adjustment methods, the injection pumps are placed individually on test benches, are connected up and are adjusted in the course of a number of operations by measuring the delivery quantity of the individual elements. These prior methods also involve manually correcting the position of rotation of the cylinder barrels equipped with control bores relative to the pistons having the inclined control edges. Apart from the adjustment method in which the cylinder barrels are rotated within a defined angular region to adjust the delivery quantity and which is used with the fuel injection pumps described initially, other adjustment methods are also known for use with injection pumps of similar construction. For example, methods are known wherein the connection between the adjusting rod and the piston is adjusted. A disadvantage in all the known testing and adjusting methods is that the adjustment of the pump depends in considerable extent on the skill of the mechanic, that is, it is subjectively influenced. In addition, the adjustment method can only be carried out with stationary, that is non-driven, pumps, an extremely time consuming process. Thus, when injection pumps are being mass-produced, for example, on a production line and assembly line, each production line or assembly line must include a large number of test benches with a corresponding number of mechanics.

SUMMARY OF THE INVENTION

The principal object of the present invention is to obviate the above-mentioned disadvantages and to provide an apparatus for and a method of adjusting the delivery quantity of the multi-cylinder fuel injection pumps described initially with which shorter adjustment times can be achieved by mechanizing this operation.

With the apparatus according to the present invention, this problem is solved in that a mechanically activatable adjusting tool is mounted in the apparatus. The adjusting tool is driven via a control gear and is force lockingly connectable to an application point or engagement point on the securing flange of the injection pump or on a transmission element coupled to the securing flange or on the cylinder barrel. A servo motor controlled by a control device is used to drive the control gear. The apparatus so constructed renders the adjusting process independent of the subjective judgment of a mechanic.

It has proved especially advantageous for the servo motor to be in the form of an electromotive stepping motor because a stepping motor converts the control signal supplied by the control device in accurately predeterminable adjusting steps, thus eliminating the need to indicate the position of the motor and simplifying the apparatus of the present invention. Hydraulic working cylinders could obviously also be used as the servo motors, but such cylinders would obviously have to be equipped with remote position indicators as otherwise the adjusting path predetermined by the control device could not be followed accurately.

It has also proved advantageous for the control gear to consist essentially of a worm gear provided with an adjusting worm and for the adjusting worm to engage in a groove in the adjusting tool. By transmitting the adjusting movements from the control gear to the adjusting tool in this manner, adjusting forces of great magnitude can be transmitted very simply in spite of the limited structural space.

To reduce the amount of assembly or preparation time for adjusting the injection pump, it is especially advantageous if a separate adjusting tool is provided for each pump element consisting of a piston and a cylinder barrel. The adjusting time can be further shortened by connecting each adjusting tool to a control gear and a servo motor, the latter being displaced with respect to each other in the apparatus as this enables the adjusting processes to be controlled in rapid succession or even to be effected simultaneously.

To enable the pump to be inserted in the apparatus without hindrance in the axial direction of the drive means, the adjusting tools are combined with the control gears and servo motors to form and adjusting device which is mounted in the housing of the apparatus in such a manner and position that it can be fitted in and out of the operating position.

A further especially advantageous feature of the present invention is that a conventional process control computer supplied with a nominal value input for the prescribed data of the injection pump to be adjusted is used to activate the control device of the servo motor or motors. This process control computer is supplied with a measuring and adjusting program. The input of the computer is connected to a conventional delivery quantity indicator of a conventional delivery quantity measuring device and to a tachometer of the drive unit equipped with a revolution regulating device. The output of the process control computer is connected to the control device of the servo motor or motors. Thus the device is completely independent of subjective influences on the part of the mechanic and operates so rapidly that the device can be connected directly with an assembly belt and can be designed in such a way that the testing and adjusting time is regulated according to the timing of the assembly belt. By using the process control computer all the pump elements can be adjusted simultaneously, thus saving a considerable amount of time over the known adjustment processes.

The method according to the invention for adjusting the delivery quantity of multi-cylinder fuel injection pumps using the apparatus according to the present invention is characterized essentially in that the adjusting tool driven by the servo motor is coupled with the application or engagement point on the securing flange or transmission element of the injection pump which is inserted in and gripped in the clamping device and coupled to the drive unit. The method is further characterized in that after measuring the delivery quantity by means of the delivery quantity measuring device at a predetermined constant rotational speed, the control device of the servo motor receives a control signal which is dependent on the difference between the measured delivery quantity and its nominal value. The servo motor rotates the cylinder barrel of the injection pump in one or more adjusting steps via the control gear and adjusting tool unit the delivery quantity is identical to the nominal value. Prior to adjustment the screws of the securing flange holding the cylinder barrel in its fitting position are only turned with a partial torque, which does not adversely effect the delivery quantity of the pump and which permits mechanical rotation of the securing flange or cylinder barrel; the screws of the securing flange are only tightened fully after the adjusting step or steps are completed. In this way adjustment of the fuel delivery quantity of the individual pump elements and the synchronization of these pump elements can be effected mechanically while the pump is running. It is especially advantageous for the control device of the servo motor to be activated by the process control computer which supplies the necessary signals for the control device in one or more process steps after comparing the measured delivery quantity with the nominal values of the same and optimization computation.

The fully automatic operating cycle can be achieved owing to the fact that all the measuring and adjusting steps including clamping, connecting and driving the injection pump and adjusting the position of the regulating rod are controlled fully automatically by the process control computer and control device.

Other objects, features and advantages of the present invention are to be made apparent from the following detailed description of the preferred embodiments thereof, reference being made to the accompanying drawing.

DESCRIPTION OF THE PREFERRED EMBODIMENTS

Figure 1:
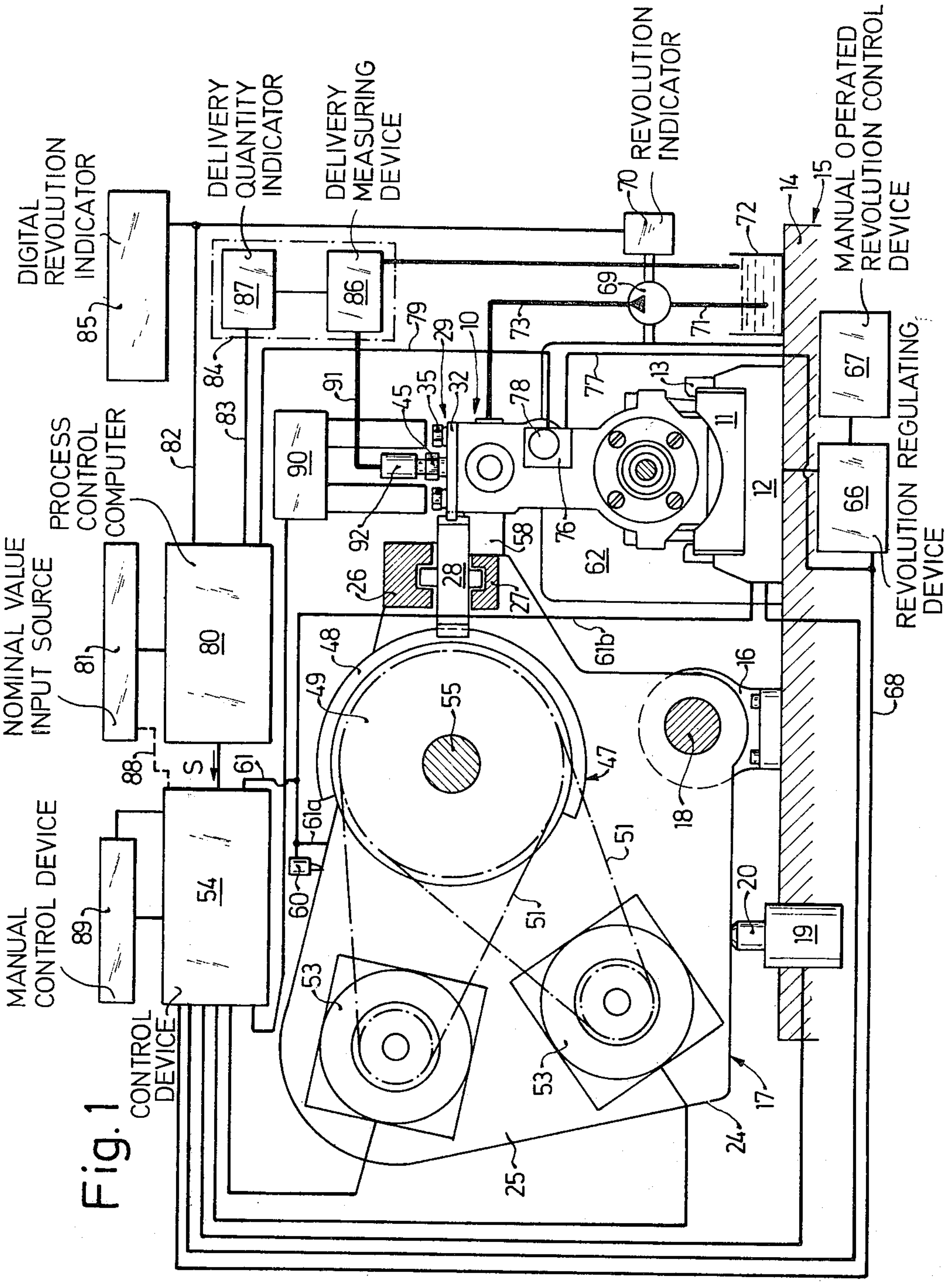
FIG. 1 is a diagrammatic, partially schematic illustration of the essential parts of a first embodiment of an apparatus for adjusting multi-cylinder pumps according to the present invention in combination with a simplified illustration of an injection pump clamped in the apparatus.

As shown in FIG. 1, a multi-cylinder fuel injection pump 10 is present in an apparatus for adjusting such pumps according to an illustrative embodiment of the present invention. The pump 10 is screwed to a work piece support 11 and clamped by the work piece support 11 in a clamping device 12. The clamping device 12 includes securing jaws 13 which in the case of an apparatus according to the present invention are activated by working cylinders in a manner known per se which consequently need not be described in further detail. The clamping device 12 is secured to a base plate 14 of the apparatus housing 15 which is not represented in great detail. The same applies to bearing blocks 16 of an adjusting device 17, only one of which is represented in FIGS. 1–3.

The adjusting device 17 includes a shaft 18 mounted in the bearing blocks 16. The shaft 18 acts as the swivel axis for the adjusting device 17. The adjusting device 17 is moved, via a positioning piston 20, into the operating position by a servo motor 19 which in the following example is in the form of a hydraulic piston cylinder unit. As is apparent from FIGS. 2 and 3, the position of the adjusting device 17 designated as the operating position is represented in the drawing figures, its stop position not being represented. These positions are determined by an opening 21, a limit bearing 22 and an axis defining rod 23, which is rigidly connected to the adjusting device 17. The rod 23 acts as a limit stop and as an opposed bearing for the piston 20 of the servo motor 19. A housing 24 of the adjusting device 17 includes essentially two base plates 25, only one of which is represented in FIGS. 1–3 and two cross beams 26 and 27 in which adjusting tools 28, in the form of two arm levers, are mounted.

Figure 2:
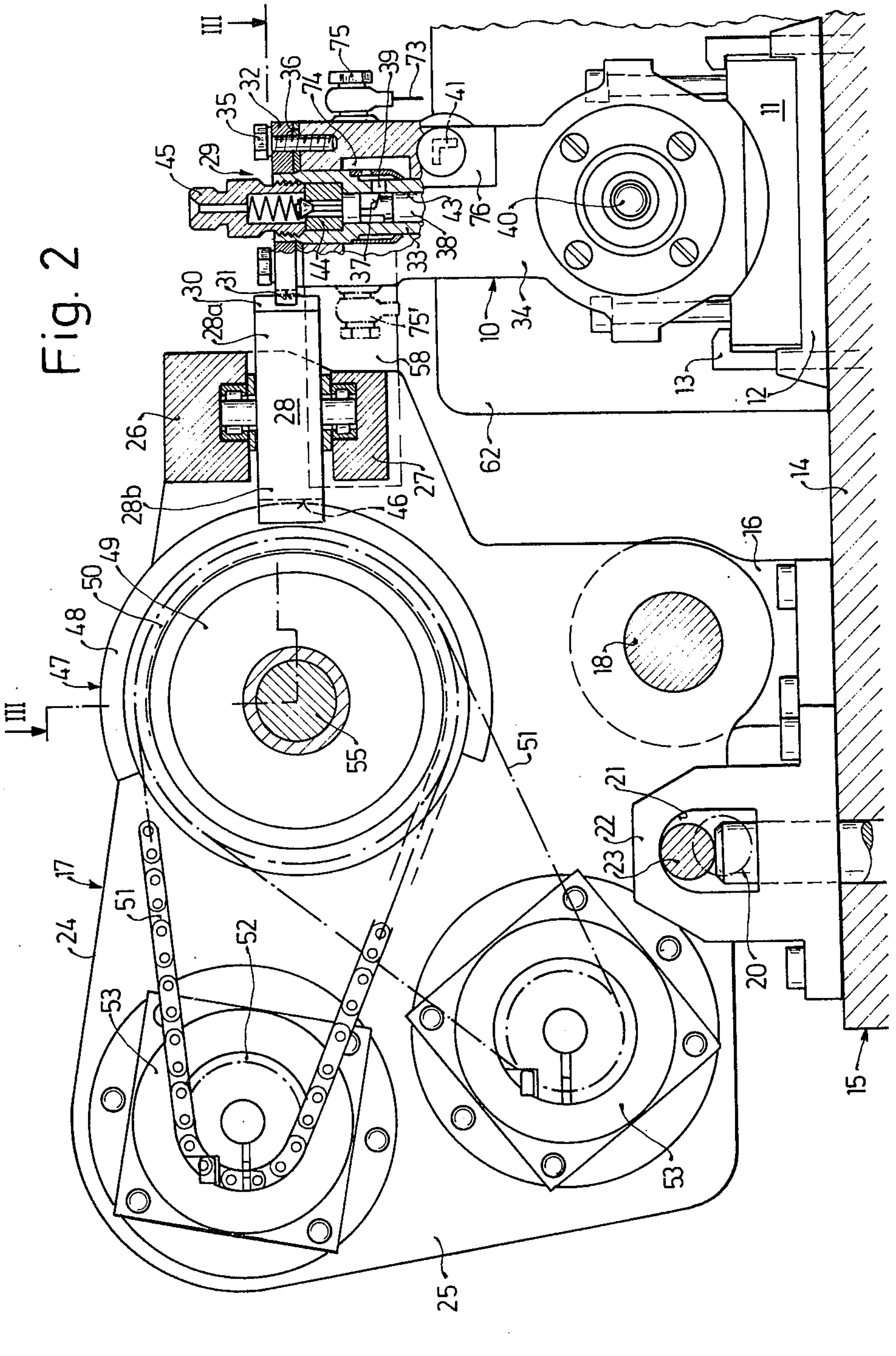
FIG. 2 is a partial sectional view of the injection pump clamped in the apparatus of FIG. 1 and driven by its drive unit, an enlarged scale view of the adjusting device, including an adjusting tool, a control gear and a servo motor, being shown.
Figures 3, 4:
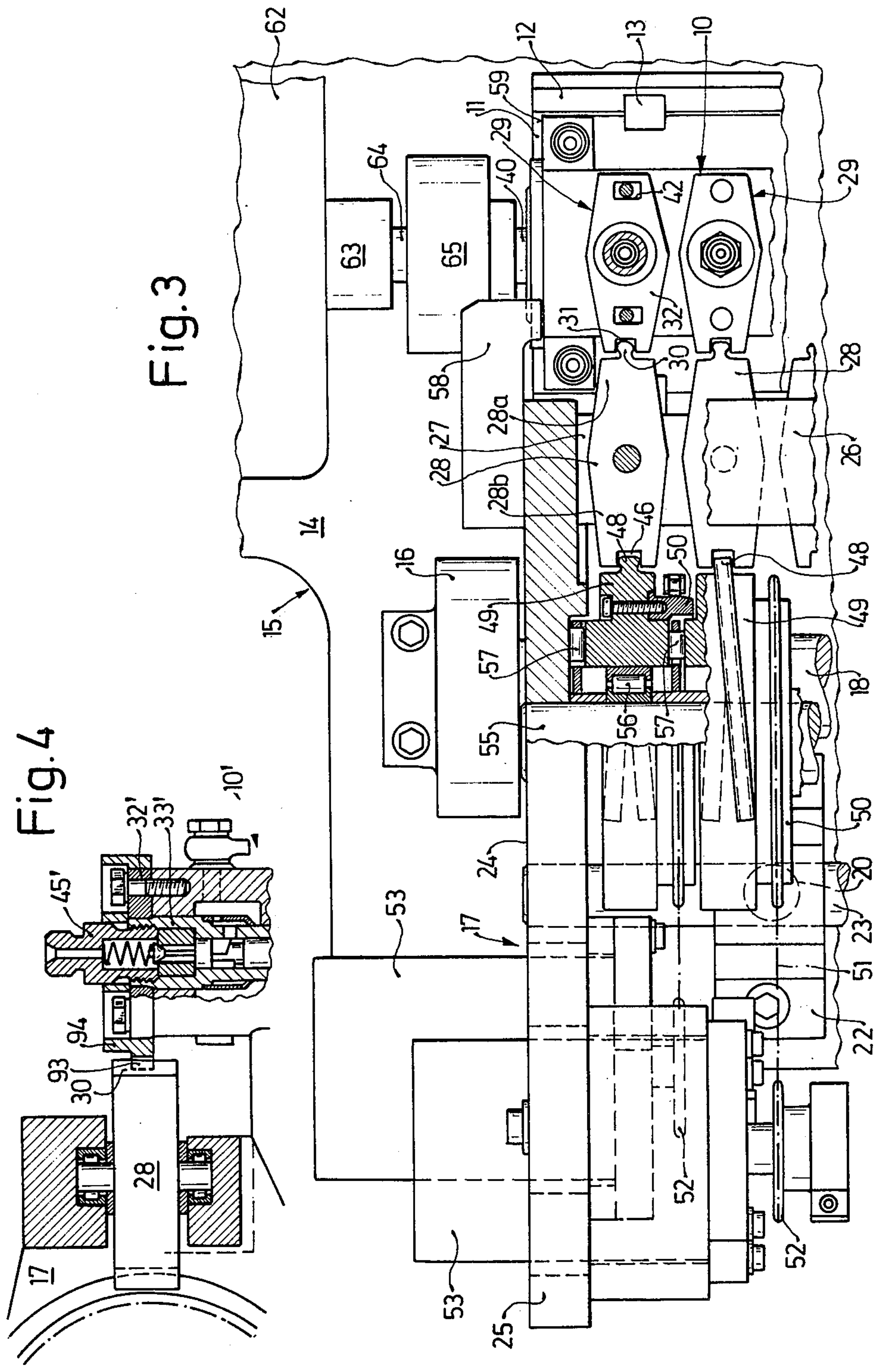
FIG. 3 is a sectional plan view along section line III—III in FIG. 2 of the parts of the device represented in FIG. 2 including the injection pump.
FIG. 4 is a section view of a modified version of the apparatus of FIG. 2 illustrating a second embodiment of an apparatus for adjusting multi-cylinder pumps according to the present invention.

The apparatus represented in FIGS. 1–3 of the drawing is fully automated and accordingly, as is represented in FIG. 3, an individual adjusting tool 28 is provided for each pump element 29 of the injection pump 10 in the form of an in-line pump. The apparatus could obviously only be provided with a single adjusting tool 28 which would be displaceably mounted on the shaft 18 in the axial direction of the injection pump or in the axial direction of the shaft 18 together with an appropriately modified housing 24 and it would be moved sequentially into the appropriate operating position to adjust each pump element 29.

As is clearly shown in FIGS. 2 and 3, and is shown in simplified form in FIG. 1, the adjusting tool 28 engages with a web form protuberance 30 located on its one lever arm 28*a* and a groove 31 acting as an engagement point on the outer periphery of a securing flange 32 for the pump element 29 of the injection pump 10. In the case of the injection pump 10 represented in FIGS. 1–3, the securing flange 32 is a fixed part of a cylinder barrrel 33 (see FIG. 2) which is inserted in a manner known per se in a pump housing 34 of the injection pump 10 and is clamped by means of two screws 35 against the upper front face 36 of the pump housing 34 and held in its fitting position. A piston 38 having at least one inclined control edge 37 is axially and rotatably guided in the cylinder barrel 33 in a manner known per se and the inclined control edge 37 cooperates with a control opening 39 in the wall of the cylinder barrel 33. The axial movements or lifting movements of the piston 38 are produced by a cam shaft 40. However, the rotary movements of the piston 38 for voluntarily altering the amount of fuel required are produced in a manner known per se by an adjusting rod 41 represented by the perforated lines. The control of the adjusting rod 41 runs parallel to the longitudinal axis of the injection pump 10 or of the cam shaft 40 and are converted into rotary movements of the piston 38 by an adjusting gear which is not represented in further detail.

As a result of the rotation of the piston 38, the relative position of the inclined control edge 37 with respect to the control opening 39 is altered and accordingly the quantity of fuel required per stroke by the particular pump element 29 of the injection pump. To insure that each piston 38 delivers the same quantity of fuel per stroke in the case of injection pumps in the form of in-line pumps with a fixed control rod position, it is necessary for all the elements 29 of the injection pump 10 to be adjusted to the same delivery quantity for a given position of the control rod 41. In the case of injection pumps of the above-described construction, this is achieved by turning the cylinder barrel 33 within a defined angle. For this purpose, the securing flange 32, which is rigidly connected to the cylinder barrel 33, has two longitudinal holes through which are passed the screws 35 for securing the pump element 29. A pressure valve 44 is inserted in an extension of a bore guiding the piston 38 inside the pump-element 29, which is in the form of a flange element. The pressure valve 44 is held in the position indicated by a pressure line connecting piece 45 and is clamped tight against the cylinder barrel 33. The above-described pump is especially suited to delivery quantity adjustment according to the present invention.

The adjusting tool 28, which is mounted in the adjusting device 17 or in its cross beams 26 and 27, is force lockingly and form lockingly connected to an adjusting gear 47 by a second lever arm 28*b* which faces away from the first lever arm 28*a* provided with the projection 30. The adjusting gear 47 consists essentially of a worm wheel 49 provided with an adjusting worm 48. The adjusting worm 48 engages in a groove 46 of the adjusting tool 28. The worm wheel 49 is provided with a cog wheel 50 and is connected, via a chain 51, to a drive cog wheel 52 of an electromotive stepping motor 53 acting as a servo motor. As is shown in FIG. 1, the stepping motor 53 is controlled by a control device 54.

FIGS. 1–3, and in particular FIG. 3, show two identical adjusting gears 47 each activating an adjusting tool 28. The adjusting gears 47 are each driven by chains 51 by one of the stepping motors 53 mounted in a scattered arrangement on the common base plate 25. The second base plate, which is not visible in the drawing figures, is mounted as a mirror image of the plate 25 represented and bears at least two servo motors and adjusting gears arranged in the same manner as shown in FIG. 3 such that the apparatus is set up for the fully automatic adjustment of a four cylinder in-line injection pump. The above-described apparatus can also be equipped for larger injection pumps having more pump elements by arranging more than two stepping motors on each base plate or by incorporating another base plate in the apparatus.

All the worm wheels 49 which are connected in a force locking and form locking manner to an adjusting tool 28 are mounted for rotation about a common axis defined by a rod 55 which is secured to the base plate 25 of the adjusting device 17. Each worm wheel 49 is mounted on the rod 55 with a radial bearing 56, acting as a pivot bearing, and two axial bearings 57, acting as support bearings, via which it is directly or indirectly supported on the housing 24 of the adjusting device 17. The common axial bearing 57 is incorporated between each pair of adjacent worm wheels 49 to reduce cost and space. The base plate 25 represented in the drawing, is rigidly connected to a stop 58 against which the injection pump 10 is supported by its front face 59 such that the adjusting forces transferred to the injection pump 10, when adjusting the cylinder barrels 33, are taken up by the stop 58. As subsequently to be described in further detail, the adjusting forces only act in the direction of the stop 58. In FIG. 1 the reference numeral 60 designates a position indicator in the form of an end switch which supplies a signal to the control device 54 when the adjusting device 17 has reached the operating position indicated in which the adjusting tool or tools 28 are in engagement with the securing flange 32 of the injection pump 10 after the adjusting device 17 has been pivoted by the servo motor 19 or by its piston 20 about its shaft 18 acting as its pivot axis. The position signal supplied by the position indicator 60 is supplied, via a line 61, to the control device 54. Further position signals from switches and position indicators, which are not illustrated in detail, belonging to the adjusting device 17, the clamping device 12 and a drive unit 62 are supplied to the line 61 via lines 61*a* and 61*b*. For example, position signals are supplied via the line 61*a* from indicators, which are not illustrated, and which indicates the end positions of the worm wheel 49 provided with the adjusting worm 48 and the line 61*b* conveys position signals which indicate the correct position on the work piece support 11 within the clamping device 12, the clamping position of the securing jaws 13 and the drive readiness of a rapid acting coupling 63 of the drive unit 62 (see FIG. 3). A shaft end 64 which is part of a nonrotatable but flexible coupling 65 connected to the cam shaft 40 of the injection pump 10 is gripped by the rapid acting coupling 63.

As is apparent from the simplified view provided in FIG. 1, the drive unit 62 is provided with a revolution regulating device 66 which is controlled selectively by a manually activatable revolution control device 67 or automatically by the control device 54 via a control line 68. A delivery pump 69 and preferably an inductive tachometer 70 are driven by the drive unit 62 which preferably contains a thyristor-controlled synchronous motor. The delivery pump 69 draws fuel via a section line 71 from a tank 72 and supplies this fuel via a delivery line 73 to the suction chambers 74 of the injection pump 10, as represented in FIG. 2. As may be seen from FIG. 2, the fuel is supplied from the delivery line 73 to the suction chambers 74 via a pipe connection 75 which, in the embodiment represented, is on the right side of the injection pump 10 but in the case of a different arrangement of the pump on the motor, it can also be on the opposite side as is indicated by the connection 75' represented by the perforated lines. For this reason, the adjusting tool 28 is also inserted in the described embodiment between the worm wheel 49 and the securing flange 32 because direct activation of the securing flange 32 by the adjusting worm 48 of the worm wheel 49 would not be possible with the connection 75' in the position indicated by the perforated lines.

The adjusting rod 41, as shown in FIG. 2, is moved into the requisite position for adjusting the injection pump 10 either manually or, in the case of the fully automatic device represented, by an adjusting member 76. In this process the adjusting member 76 is controlled by the control device 54 via a line 77 which branches off from the control line 68. The controlled position of the adjusting rod 41 is supplied to a process control computer 80 by a position indicator 78 via a line 79. In addition to the signal for the adjusting position of the rod 41, this process control computer 80 which is provided with a signal from a nominal value input source 81, receives a revolution indicating signal from the tachometer 70 via a line 82 and the measured values of a delivery quantity measuring device 84 via a line 83. A digital revolution indicator 85 is connected to the tachometer 70 or to the line 82 for purposes of providing a visible indication of speed as an aid in manually controlling the apparatus. The delivery quantity measuring device 84 includes a delivery quantity measuring device 86 and a digital delivery quantity indicator device 87 for each pump element 29 to be measured simultaneously. The delivery quantity indicating device 87 is required for monitoring the apparatus and for the semi-automatic operation thereof and also serves as a delivery quantity indicator for the control device 54. If the process control computer 80 is not used, the signals supplied via the lines 79, 82 and 83 are passed directly through to the control device 54. As is indicated by a perforated line 88, individual values for controlling the apparatus, preferably fed into the nominal value input 81 by means of a punch card are supplied directly to the control device 54. For a semi-automatic operation, the control device 54 is also provided with a manual control device 89 by means of which all the operating steps of the adjusting method, which have already been described in further detail, can be manually controlled and which contains the digital indicating instruments for all the functions of the device. The extent to which the manually operated revolution control device 67 and the digital revolution indicator 85 and the delivery quantity indicating device 87 can be integrated in this manual control device 89 is unimportant to the invention. Many possibilities will be readily apparent to specialists in the art, who may select any of a number of techniques for integrating the parts.

In FIG. 1, 90 designates a screwing device which is also activated by the control device 54 and which is used to tighten the screws 35 which, as has already been stated, prior to adjustment of the cylinder barrel 33, are only tightened with a partial torque which does not adversely affect the delivery of the pump 10 and permits mechanical turning of the securing flange 32 or the cylinder barrel 33 and which are only fully tightened fully after the adjustment operation. It may be advantageous to mount a screwing device of this type on the assembly line in front of and after the main portion of the apparatus in order to shorten the time of the adjusting period within this main portion of the apparatus.

The delivery quantity measuring device 86 of the delivery quantity measuring device 84 is connected via a pressure line 91 by means of a pipe coupling 92 (see FIG. 1). The pipe coupling 92 is in the form of an attachable rapid coupling or an automated clamping device to be activated by a piston (not illustrated).

The second embodiment according to FIG. 4 differs from the embodiment represented in FIGS. 1–3 merely in that the adjusting tool 28 of the adjusting device 17 does not have a web or the like, protuberance 30 projecting directly into the groove 31 on the securing flange 32 of the injection pump 10 (FIG. 1). Rather, as shown in FIG. 4, a groove 93 of a transmission part 94 of an injection pump 10' is contacted by the protuberance 30. In the embodiment represented, the transmission part 94 comprises a known securing flange 32' of the injection pump 10'. This securing flange 32' is not specially equipped for the adjustment operation. As in the case of the pump 10 according to FIGS. 1–3, the securing flange 32' is rigidly connected to a cylinder barrel 33'. Injection pumps are also known wherein the securing flange is separate from the cylinder barrel and which clamp the same in the housing.

Figure 5:
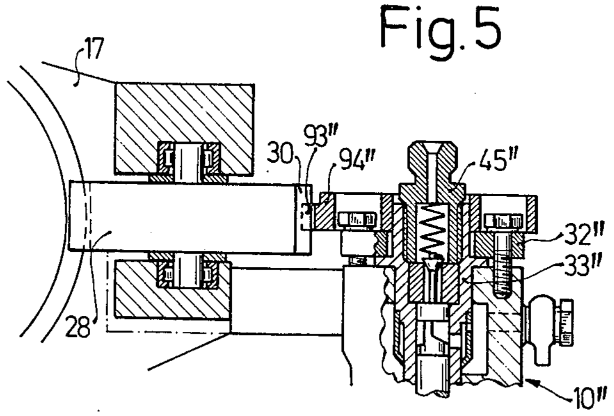
FIG. 5 is a section view of another modified version of the apparatus of FIG. 2 illustrating a third embodiment of an apparatus for adjusting multi-cylinder pumps according to the present invention.

Such a pump 10'' is shown in FIG. 5 which is representing that part of the third embodiment which differs from the first or second embodiment. In the case of this pump 10'', a transmission part 94'' acts directly on a cylinder barrel 33'' which comprises a pipe connection 45'' and a groove 93'' of the transmission part 94'' is contacted by the protuberance 30 of the adjusting tool 28 of the adjusting device 17. It may also be in the scope of the invention if the transmission part 94'' would act directly on the pipe connection 45'' which is screwed and fastened in the cylinder barrel 33'' (not shown).

The described apparatus is used for the mechanical or mechanized adjustment of the delivery quantity of the individual pump elements 29 of the injection pumps 10, 10' or 10'' which are in the form of inline pumps. This function can be described as delivery quantity synchronization, with the adjusting rod 41 in a predetermined fixed position, the fuel delivery quantity of each individual element of the injection pump 10 or 10' or 10'' is adjusted to the same delivery quantity within given tolerance limits. The most important measuring point for this delivery quantity synchronization is the so-called full load quantity which is measured at the full load speed of the injection pump. Two further measuring points coinciding with the idling speed and the so-called upper idling speed are established to compensate for or discover faults due to manufacturing errors in the pump elements.

The operation of the apparatus according to the invention will now be described with reference to FIGS. 1–3 in the case of a fully automatic operation controlled by the process control computer 80 and the control device 54 for adjusting the delivery quantity of the elements 29 of the injection pump 10.

The injection pump 10, which is mounted on the work piece support 11, is introduced into the clamping device 12 by the assembly belt located in front of the apparatus. In the clamping device 12, the injection pump 10 is clamped by means of the securing jaws 13. The shaft end 64, which is connected via the coupling 65 to the cam shaft 40 of the injection pump 10 is simultaneously non-rotatably coupled by the rapidaction coupling 63 of the drive unit 62 (FIG. 3). The pressure lines 91 for each pump element 29 with their pipe couplings 92 are then connected to the pressure line connecting piece 45. The delivery line 73 is connected to the pipe connection 75 together with a conventional return line (not shown) and which is connected at the same level to a connection point on the pump 10 and returns excess fuel to the tank 72. After the adjusting member 76 with the position indicator 78 having coupled to the adjusting rod 41 and the adjusting device 17 has been pivoted by activating the servo motor 19 into the indicated operating position in which the adjusting tools 28 engaged in the grooves 31 of the securing flange 32, the apparatus is ready for operation. The screws 35 have advantageously already been tightened on the assembly belt with a partial torque, which is less than the final retaining torque, and does not adversely affect the delivery quantity but also permits mechanical turning of the securing flange 32. A partial torque of approximately 0.4 kiloponds (MKP) has proved especially advantageous.

As is shown in FIG. 3, the injection pump 10 rests with its front face 59 against the stop 58. It has proved advantageous for the securing flange 32 to be in an end position limited by the longitudinal holes associated with the flange 32 and produced by turning to the left (anti-clockwise) in the delivery space. As the securing flange 32 is generally disposed in the central position indicated, the flange 32 is turned by means of the adjusting tool 28 in a clockwise direction so that the adjusting forces transmitted to the pump 10 are taken up by the stop 58.

The actual delivery quantity measuring and adjusting operation now begins. The speed of revolution regulating device 66 receives a signal from the control device 54 via the control line 68. On account of this signal, the drive unit 62 drives the injection pump at full speed. When this speed has been reached, the data obtained from the delivery quantity indicators 87 through the continuous measurements taken by the delivery quantity measuring device 86 is supplied to the process control computer 80 via the line 83. The computer 80 is programmed for the entire adjusting program and has received the pertinent adjusting and measuring data for the particular pump which is to be adjusted via the nominal value input source 81 from punch cards or the like.

After comparing the measured data with the nominal values, the stepping motor 53 is controlled by the control device 54 in such a way that by turning the worm wheel 49, the securing flange 32 is turned by the adjusting tool 28 it is a short distance before its position corresponding to the nominal delivery quantity. The delivery quantity of the pump element 29 which is now measured is supplied to the process control computer 80. To measure the second measuring point, the injection pump 10 is driven at its upper idling speed by the drive unit 62 and the adjusting rod 41 is moved into the corresponding position by the adjusting member 76. The delivery quantity measured in this position at this speed is also supplied to the process control computer 80. To obtain a third measuring point, the speed and adjusting rod path for the lower idling speed can also be engaged. The delivery quantity obtained is also stored in the process control computer 80 and at the next step, it leads the process control computer 80 through an optimization computation. In the course thereof, the process control computer 80 decides whether, with the given delivery quantity values, it is possible to make a flange adjustment where the delivery quantity at all three measuring points is within the tolerance limits. If the process control computer 80 decides that this is not possible, the measuring routing is interrupted and the injection pump 19 is removed to be overhauled. An error report established by the process control computer 80 makes it possible to determine quickly the faulty element or elements. If the process control computer 80 makes an affirmative decision, then the securing flange 32 is moved into its nominal position in response to corresponding signals from the process control computer 80. In this position, one or all the measuring points are once again measured and checked and if the adjustment is faultless, the drive unit 62 is disconnected, the connections of the lines 73 and 91 are interrupted, the adjusting device 17 is moved from the operating position, and as indicated, by the lowering of the piston 20 of the servo motor 19 into its stopped position, the rapid-acting coupling 63 of the drive unit 62 is disengaged, the securing jaws 13 are released and the injection pump 10 with its workpiece support 11 is removed from the clamping device 12.

The above-mentioned steps, which have been described in reference to a fully automatic adjustment routine, can also be released by the control device 54 in semi-automatic operation whereby the individual steps are effected by signals to the control device 54 by an operator, using the manual control device 89. The drive speed is also pre-selected in the manual control device 89 or is set in the speed control device 67 connected to the speed of revolution regulating device 66. The actual speed is read from the digital speed indicator 85, the quantity being delivered is taken from the delivery quantity indicating device 87 which simultaneously sets as a delivery quantity transmitter and the other operating positions such as the operating position of the adjusting device 17, which is represented in the figures of drawings and is transmitted by the position indicator 60 to the control device 54. The values are indicated on the manual control device 89 by means of known signal lines which are consequently not represented in further detail. In place of the optimization computation effected by the process control computer 80 to control the stepping motors 53, the operator takes the steps to be effected by the stepping motors 53 from a table and supplies the corresponding valve to the manual control device 89.

When rotating the securing flange 32, special care must be taken to insure that the nominal value is not exceeded during the first adjusting operation as rotation in the opposite direction to the adjusting direction is either not possible or would be disadvantageous owing to the play in the individual adjusting members and owing to the stop 58 which is only provided on one side.

The decision to provide the adjusting device 17 with the stepping motors 53 and to drive the worm wheel 49 via the chains 51 have proved a very simple and also advantageous solution. The stepping motors 53 can be controlled with precisely defined control signals and require no adjustment of the position obtained. the chains 51 permit inexpensive and friction-free transmission of the fairly considerable adjusting forces. The adjusting movement produced by the adjusting tool 28 on the securing flange 32 can be very accurately engaged and sufficiently powerful adjusting forces can be applied owing to the stepping down of the rotation of the stepping motors 53 by the drive wheel 52 and the cog wheel 50 of the worm wheel 49 and owing to the adjusting worm 48 provided with a very gradual incline. Other known mechanical or hydraulic drive means can obviously also be provided for the adjusting tool 28 in place of the servomotors 53 and the worm wheel 49. The choice of possible drive means for the space in the axial direction of the pump camshaft 40 defined by the spacing between the pump element 29 is very limited and accordingly the selected arrangement has proved especially advantageous.

The delivery quantity measuring device 84, which includes the delivery quantity measuring apparatus 86 and the indicating devices 87, and the control means, as there are the control device 54 with the manual control device 89, the revolution regulating device 66 with the manual operated revolution control device 67, the digital revolution indicator 85 and the process control computer 80 with the nominal value input source 81 are in themselves not the object of the present invention. It is preferable to use for the measuring of the delivery quantity a continuously measuring, indicating and measuring signal transmitting measuring device such as the device marketed under the name PDQmeter produced by the firm of Industrial Measurements and Controls, Pomona, California, U.S.A. This device is also designated as a "Positive Displacement Flowmeter" (U.S. Pat. NO. 2,934,938). The "Quantity Indicator" produced by Robert Bosch GmbH, Stuttgart, and disclosed in British Pat. No. 1,172,623 and Bosch Technische Berichte, Heft 3, Juni 1965, pages 139–151 can also be used as the delivery quantity measuring device 86. As the process control computer 80 with the nominal value input source 81 there may be used a computer marketed unter the name PDP-11 and a nominal value input source named Teletype produced by the firm of Digital Equipment Corp., Maynard, Massachusetts U.S.A. and described in pdp-11 hand book, copyright 1969 by Digital Equipment Corporation. It is preferable to use also for this purpose process control computer marketed under the name MINCAL 621 produced by the firm Heinrich Dietz Industrieelektronik, 433 Mulheim/Ruhr, West-Germany and a nominal value input source marketed under the name Matrixomat produced by the firm Hartmann & Lammle OHG, Stuttgart, West-Germany. The control device 54 includes a conventional solid state control (wired logic), a control apparatus to control the stepping motors 53 as disclosed in U.S. Pat. Nos. 3,514,680 and 3,254,286 and in Electronic Design 10, May 11, 1972, pages 52 - 54. The control device 54 may be automatically controlled by the computer 80 or semiautomatically by an operator using the manual control device 89, which includes well-known push buttons and relay switches to control the steps of the stepping motors 53. The revolution regulating device 66 is preferable a frequency-analog motor control system as disclosed in Regelungstechnik, Heft 11 - 1968 pages 497 – 500 whose input is fed by the computer 80 or in a well-known manner by the manual operated revolution control device 67. The momentary revolution resp. the actual speed may be read from the digital speed indicator 85. Such an indicator is well-known and therefore not further described.

While three illustrative embodiments of an apparatus for adjusting fuel injection pumps and variants have been illustrated and described, it is to be appreciated that numerous other embodiments and variants are possible within the spirit and scope of the present invention. The scope is defined in the appended claims.

What is claimed is:

1. In an apparatus for adjusting the delivery quantity on multi-cylinder fuel injection pumps including drive means and a clamping device for such injection pumps, which are of the in-line type, the pistons of which have at least one inclined control edge and are axially and rotatably guided in cylinder barrels and which are each held in their fitting position at least indirectly by a securing flange positioned against an upper front face of a pump housing by screws, these barrels being rotatable within a defined angle to adjust the delivery quantity and receiving a pressure valve in an extension of the bore receiving a piston and including a delivery quantity measuring device for measuring and indicating the quantity of fuel delivered per given stroke or unit of time, the improvement comprising a control means; a mechanically activatable adjusting tool mounted within the apparatus; an adjusting gear coupled to said adjusting tool, said tool being force lockingly engageable with an application point on a pump to be adjusted; and servo motor means controlled by said control means for driving said adjusting gear.

2. An apparatus as claimed in claim 1, wherein the application point on the pump comprises an application point on said securing flange.

3. An apparatus as claimed in claim 1, wherein the application point on the pump comprises an application point on a transmission member, said transmission member being coupled to said securing flange.

4. An apparatus as claimed in claim 1, wherein the application point on the pump comprises an application point on a transmission member, said transmission member being coupled to said cylinder barrel.

5. An apparatus as claimed in claim 1, wherein said servo motor means is in the form of at least one electromotive stepping motor.

6. An apparatus as claimed in claim 1, wherein said adjusting tool is provided with a groove, and said adjusting gear comprises a worm wheel provided with an adjusting worm, said adjusting worm engaging in said groove of said adjusting tool.

7. An apparatus as claimed in claim 6 including a chain means, and wherein said worm wheel is provided with a cog wheel adapted to be driven by said servo motor via said chain means.

8. An apparatus as claimed in claim 6, including a housing, and wherein said worm wheel is mounted in said housing, which forms part of an adjusting means with a radial bearing acting as the pivot bearing and with two axial bearings serving as the support bearings.

9. An apparatus as claimed in claim 1, including a plurality of adjusting tools, one being provided for each pump element which includes a piston and a cylinder barrel.

10. An apparatus as claimed in claim 9, wherein each of said adjusting tools is connected to said adjusting gear and said servo motor, the latter being mounted within the apparatus in a spacially displaced arrangement.

11. An apparatus as claimed in claim 10, wherein said adjusting tools are combined with respective adjusting gears and sevo motors to form an adjusting device mounted in the housing of the apparatus so as to be jointly pivotable in and out of operating position.

12. An apparatus as claimed in claim 9, wherein each of said adjusting tools is in the form of two armed levers, and including a plurality of worm wheels mounted for rotation about a common axis.

13. An apparatus as claimed in claim 1, further including a process control computer for activating said control means for said servo motor means, said computer being provided with a nominal value input from a signal source for the precribed measuring data of the injection pump sought to be adjusted, said computer also having a measuring and adjusting signal program at its input from a delivery quantity indicator of a delivery quantity measuring device and a speed indicator of drive unit for the pump fitted with a speed regulating device having its output being connected to said control device of said servo motor means.

14. An apparatus as claimed in claim 13, wherein the input of said process control computer is also connected to a position indicator of an adjusting rod of the injection pump sought to be adjusted and its output is connected to a positioning member to activate said adjusting rod.

15. A method of adjusting the delivery quantity of multi-cylinder fuel injection pumps comprising providing an adjusting tool driven by servo motor means, coupling the adjusting tool to an application or engagement point on a securing flange, or a transmission part of an injection pump sought to be adjusted and which is mounted and clamped in a clamping device and coupled with a drive unit, measuring the delivery quantity by means of the delivery quantity measuring device at a given constant speed, providing a signal to a control device of the servo motor means indicative of the difference between the measuring delivery quantity and its nominal value, rotating the cylinder barrel of the injection pump sought to be adjusted by the servo motor means via an adjusting gear, moving the adjusting tool in at least one adjusting routine until the delivery quantity is equal to the nominal value, and finally tightening screws of a securing flange holding the cylinder barrel in its test position, which screws have been turned prior to the adjustment routine with a partial torque which does not adversely effect the delivery of the pump and which permits mechanical rotation of the securing flange or of the cylinder barrel, the final tightening being effected after the adjustment routine.

16. A method as claimed in claim 15, including activating the control device of the servo motor means using a process control computer supplying control signals for the control device in one or more process steps after comparing the measured delivery quantities with their nominal value and effecting an optimization computation.

17. A method as claimed in claim 15, wherein only the measuring and adjusting steps, including clamping, connecting and driving the injection pump, and adjusting the position of an adjusting rod are controlled fully automatically by a process control computer and the control device.

* * * * *